April 27, 1943.   P. ROBINSON   2,317,642
ELECTRICAL CAPACITOR
Filed March 18, 1940

PRESTON ROBINSON   INVENTOR.
BY Dorsey Cole & Garner
ATTORNEYS.

Patented Apr. 27, 1943

2,317,642

UNITED STATES PATENT OFFICE 2,317,642

ELECTRICAL CAPACITOR

Preston Robinson, Williamstown, Mass., assignor to Sprague Specialties Co., North Adams, Mass., a corporation of Massachusetts Application March 18, 1940, Serial No. 324,724

8 Claims. (Cl. 172—246)

The present invention relates to electrical capacitors for power factor correction and to novel circuit arrangements for the operation thereof.

Capacitors for power factor correction comprise as their main elements two metal foil electrodes convolutely wound to form a roll. Interposed between the electrodes are insulating layers consisting usually of paper, impregnated with a suitable low loss dielectric fluid.

Each of the electrode foils is provided, in practice, with a plurality of tabs uniformly distributed along the length of the foils and extending beyond the convolute section, whereby the tabs of each foil are interconnected and serve as the external electrical connections of the capacitor.

As the impregnating fluid for the insulating layers, various dielectric liquids exhibiting polar characteristics are preferred, for example, the halogenated diphenyls and in particular chlorinated diphenyl. Among the advantages of dielectric liquids of this type is their comparatively high dielectric constant.

Polar dielectric liquids, however, are characterized by an outstanding drawback which has restricted their more general use in capacitors for power factor correction, namely, their normally comparatively high and substantially constant dielectric constant radically decreases in value as the liquid solidifies or "freezes."

This behavior of polar liquids has prevented their use for capacitors which are used for intermittent service, in which they are subjected to ambient temperatures below the freezing point of the polar liquid.

Polar liquids are also characterized by a change of power factor with varying temperatures, whereby at temperatures substantially above their solidification range, as well as below their complete solidification, their power factor has a comparatively low and stable value, whereas in the range of solidification the power factor radically increases to very high values.

Because of this behavior of the power factor, capacitors having a polar liquid dielectric will not be deleteriously affected by low ambient temperatures as long as they are operated in continuous service. This because any drop in ambient temperature which tends to cause solidification of the dielectric, is counteracted by an increase in the power factor so augmenting the dielectric losses of the dielectric, as to heat the capacitor above the ambient temperature.

However, when a capacitor is used in intermittent service, and placed into operation at a temperature at which the dielectric is solidified, the above-described action cannot occur, and the capacitor is caused to operate at a low capacity value corresponding to the low dielectric constant of the solidified dielectric.

It is an object of my invention to provide means by which a capacitor having a polar liquid dielectric and operated in intermittent service at low ambient temperatures is made to assume a temperature at which it attains its normal capacity value.

Another object of my invention is to provide a novel method of increasing the temperature of a capacitor.

A still further object of my invention is to provide automatic means for increasing the operating temperature of a capacitor whenever the ambient temperature is below a predetermined value.

These and further objects of my invention will appear as the specification progresses.

In accordance with my invention, I achieve the above objects by novel circuit arrangements which introduce electrical losses in the electrode foils whenever the temperature of the capacitor has a value at which the normally fluid dielectric is solid.

There are several ways by which my novel method of heating can be effected. For example, where, as it is frequently the case, the electrode foils are provided with a plurality of interconnected tabs, I provide automatic switching means to disconnect one or more of these tabs from the others and thereby increase the effective resistance of the foil.

Again, I may heat the capacitor by causing to pass through the electrode foils by the action of automatic switching means, currents which are larger than the current passing through same in the normal operation of the capacitor.

The automatic switching to bring about such heating may be actuated in any of several manners. For example, I may use for this purpose, the changes in the temperature of the capacitor, or the change in the dielectric constant of the dielectric liquid.

My invention will be further described by means of the appended drawing in which.

Figure 1:
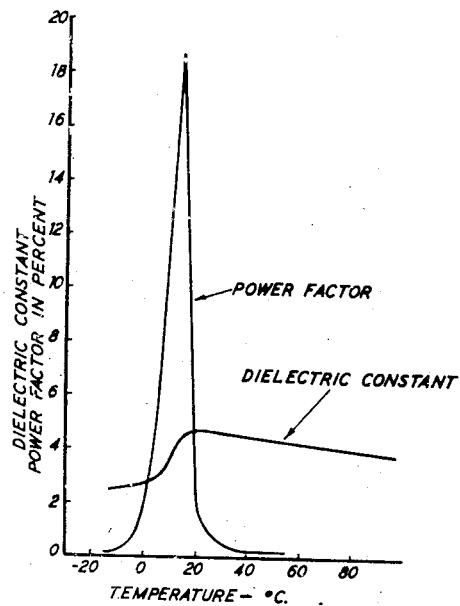
Figure 1 is a graph representing the variations of the dielectric constant and power factor of a polar liquid as a function of the temperature. The actual values shown are for chlorinated diphenyl, a widely used polar liquid; other polar liquids exhibit a similar behavior not markedly different from that shown in Fig. 1.

Referring to Fig. 1, as shown therein the dielectric constant of chlorinated diphenyl has a value of about 4.2 at a temperature of 20° C. which value gradually but only slightly decreases for higher temperatures and for practical consideration can be regarded as constant in the temperature range of 20° C. to 80° C. In the temperature range of 20° C. down to about 0° C., chlorinated diphenyl gradually solidifies, such solidification being accompanied by a corresponding decrease in its dielectric constant to a value of about 2.6. Below 0° C. the dielectric constant drops but slightly having at 20° C. below zero, a value of about 2.5.

Thus it appears that there is a decrease of about 40% in the dielectric constant of chlorinated diphenyl when its temperature drops to 0° C. or below. This decrease in dielectric constant brings about a loss of about 25% of the capacity of a capacitor, impregnated with this dielectric material.

Furthermore, as appears from Fig. 1, the power factor of chlorinated diphenyl has a low value of less than 0.5% in the temperature ranges above about 20° C. and below about 0° C. Within the temperature range of 0° C. to 20° C. corresponding to its solidfication range, the power factor of chlorinated diphenyl radically increases to a maximum value of about 18%, which maximum occurs at about 10° C.

In case a capacitor impregnated with chlorinated diphenyl is operated in continuous service, a drop in the ambient temperature to the range of solidification of the dielectric causes such an increase in the power factor of the dielectric that the dielectric losses are sufficient to maintain the capacitor at a temperature sufficiently high to prevent a substantial drop in its capacity.

However, if the capacitor is used in intermittent service and is placed in operation at an ambient temperature of 0° C. or below, the low power factor now prevailing would not heat up the capacitor substantially above the ambient temperature and thus the capacitor would operate at about 25% below its rated capacity.

Figure 2:
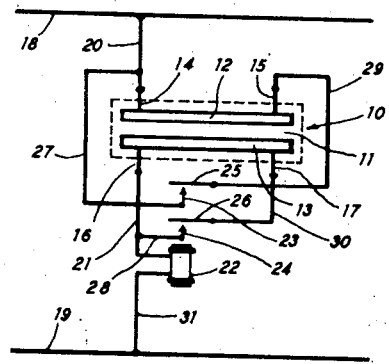
Fig. 2 is a schematic diagram illustrating one method of heating a capacitor and means to apply or discontinue such heating in accordance with the invention.

In Fig. 2, I have shown schematically a circuit arrangement for insuring operation of a capacitor at its full capacity value irrespective of the ambient temperature. In this figure, a capacitor 10 comprising two electrode foils 12 and 13 is provided with a dielectric 11 consisting of a polar liquid, for example, chlorinated diphenyl. The foils 12 and 13 are provided at each end with terminal tabs 14—15 and 16—17 respectively, which serve for the electrical connection of the capacitor to the mains 18 and 19 on which it operates.

Tab 14 is connected to the main 18 by a conductor 20, and tab 16 is connected to the main 19 by conductors 21 and 31.

Interposed between conductors 21 and 31 is a low resistance coil of a relay 22 comprising armatures 25 and 26 cooperating with corresponding contacts 23 and 24. Relay 22 operates only when the current through the coil has a predetermined value, i. e., a value which corresponds to the current passing through the capacitor when it has its normal full capacity value. Contact 23 is connected to the conductor 20 by a conductor 27 and contact 24 is connected to the conductor 21 by a conductor 28. Armature 25 is connected to the tab 15 by a conductor 29 and armature 26 is connected to the tab 17 by a conductor 30.

The operation of the circuit shown in Fig. 2 is as follows:

Assume that the capacitor 10 is placed in service at an ambient temperature which is below the solidification temperature of its polar liquid dielectric. At this temperature the dielectric constant of the polar liquid 11 having a value lower than normal, the capacity of the condenser is correspondingly subnormal. Because of this, capacity 10 draws a correspondingly lower current for the mains 18 and 19, and the armatures 25 and 26 are disengaged from their respective contacts 23 and 24. Such disengagement of armatures 25 and 26 from their respective contacts compels the capacitor current to flow through electrode foils 12 and 13 only through the tabs 14 and 16 respectively.

By so forcing the current to flow through the entire length of the electrode foils, the ohmic and reactive losses in the foils can be increased to a sufficiently high value to liquefy the dielectric 11 and establish the full capacity value of the capacitor. This now causes the normal capacitor current to flow through the coil of relay 22 and causes the armatures 25 and 26 to engage the contacts 23 and 24 respectively, thereby electrically interconnecting tabs 15 and 14 through conductor 29, armature 25, contact 23 and conductor 27, and similarly interconnecting the tabs 17 and 16 through conductor 30, armature 26, contact 24 and conductor 28.

With such interconnection of the tabs the capacitor current enters each electrode foil and passes through it via two paths whereby the electrical losses are reduced to their normal low value.

While in the above embodiment each electrode foil is assumed to be provided with only two terminal tabs, in practice as a rule a larger number of tabs are provided, one or more tabs being permanently connected to the mains and one or more tabs being interconnected with the permanent tabs through the armatures of the relay 22.

Figure 3:
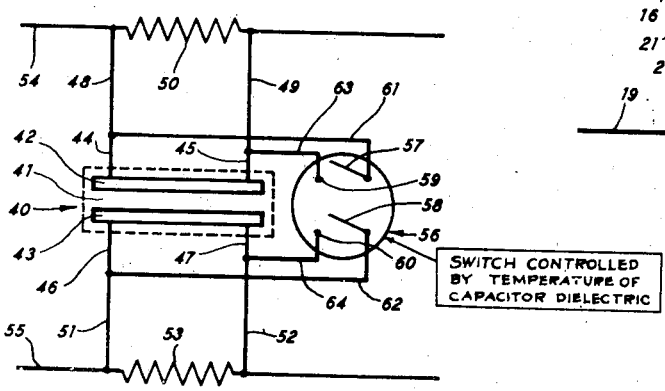
Fig. 3 is a schematic diagram illustrating another embodiment of the invention.

In Fig. 3 I have shown schematically a second method of heating a capacitor in accordance with the invention. In this method, in addition to the capacitor current, the current from the mains is caused to flow through the entire length of the electrode foils whenever the temperature of the capacitor is below the solidification temperature of the dielectric.

In this figure capacitor 40 comprising electrode foils 42 and 43 is provided with a polar liquid dielectric 41. The foils 42 and 43 are provided at their ends with terminal tabs 44—45 and 46—47 respectively. The tabs 44 and 45 of foil 42 are connected by means of conductors 48 and 49 respectively to the two ends of a resistor 50 and tabs 46 and 47 of foil 43 are connected by means of conductors 51 and 52 respectively to the two ends of a resistor 53. The resistors 50 and 53 form part of the mains 54 and 55, respectively, and are inserted in the mains between the source of power and the load the power factor of which is to be corrected by the capacitor 40.

As automatic switching means, I provide a thermoresponsive double pole single throw switch 56 having armatures 57 and 58 and contacts 59 and 60 respectively. Armature 57 is connected to conductor 48 by a conductor 61 and armature 58 is connected to conductor 51 by a conductor 62. Contacts 59 and 60 are connected to conductors 49 and 52 by conductors 63 and 64 respectively.

The switch 56 has its actuating element embedded in the dielectric 41 and assumes an open position whenever the temperature of the dielectric is at or below the solidification point of the dielectric.

The operation of the circuit arrangement of Fig. 3 is as follows:

Assume the capacitor 40 to be placed in service at a temperature at which the dielectric 41 is solid. With the switch 56 in the open position, a substantial voltage drop is established across the resistor 50 and across the ends of electrode foil 42, causing a current flow through the latter in addition to the capacitor current. In like manner a current in addition to the capacitor current is caused to flow through the foil 43.

The value of the additional current passing through foils 42 and 43 respectively is so determined as to cause sufficient heating up of the capacitor 40 as to liquefy the dielectric.

When this has been achieved switch 56 automatically closes. This short-circuits resistor 50 through conductor 61, armature 57, contact 59, and conductor 63 and interconnects tabs 44 and 45. In the same manner resistor 53 is short-circuited, and tabs 46 and 47 interconnected.

The interconnection of tags 44 and 45, respectively, tabs 46 and 47 establishes the normal connection for the operation of capacitor 40.

While the switching arrangement of the first embodiment described is magnetically operated and that of the second embodiment is thermally operated, the respective switching arrangements are mutually interchangeable. For example, as shown in Fig. 4, the relay 22 of Fig. 2 may be substituted by a thermo-responsive double-pole single-throw switch 70 having armatures 71 and 72 and contacts 73 and 74 respectively.

The switch 70 has its actuating element embedded in the dielectric of the capacitor and assumes an open position whenever the temperature of the dielectric is at or below the solidification point of the dielectric.

Figure 4:
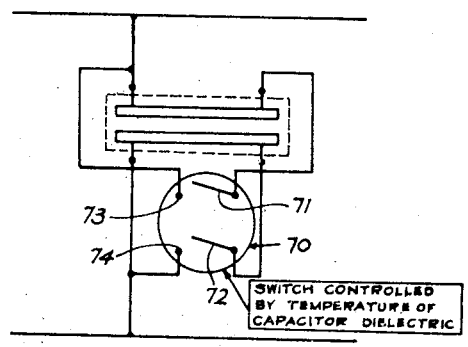
Fig. 4 is a schematic diagram illustrating the basic method of heating a capacitor as shown in Fig. 2, and shows another method of applying or discontinuing such heating in accordance with the invention.

The other elements of the circuit of Fig. 4 correspond to those of Fig. 2, similarly the method of operation of the circuit to induce heating in the capacitor is similar to that of Fig. 2 and a further description of the elements or of the operation of the circuit is believed to be unnecessary.

The extent of heating which can be realized by the invention is illustrated by the following test undertaken at normal room temperature at which the dielectric losses of the liquid dielectric were of the order of 0.3%.

A capacitor having a capacity of approximately 25 microfarads, and comprising interwound aluminum foil electrodes .0003" thick and 3.5" wide and approximately 7500" long, and having each foil provided with nine terminal tabs uniformly distributed along its length, is operated in accordance with the embodiment described in connection with Fig. 2.

The inner end-tabs of each electrode foil are made to correspond to the terminal tabs 14 and 16 of Fig. 2 whereas the remaining eight tabs of each foil represent the tabs 15 and 17 respectively.

When tabs 14 and 15 and the tabs 16 and 17 are interconnected by the relay 22, the capacitor assumes its minimum power factor giving a value of 0.34%, accounted for mainly by the losses in the dielectric liquid.

Upon opening the relay 22 the power factor is found to increase to a value of 2.81%.

If desired even greater heating of the capacitor can be achieved by the invention. For example, by using the inner end-tab of electrode foil 12 as the tab 14 and by using the outer end tab of electrode foil 13 as the tab 16, a power factor of 3.06% is obtained when the relay 22 is open.

While I have described my invention in specific embodiments and by means of specific examples, I do not wish to be limited thereto for obvious modifications will occur to those skilled in the art without departing from the spirit and scope of the invention.

What I claim is:

1. In a circuit arrangement in combination, an alternating current supply, an electrical capacitor across said supply, said capacitor comprising two electrode foils and a dielectric interposed between same, each of said foils provided with a plurality of terminal tabs for connecting said capacitor to said supply, and means responsive to the current in said capacitor to disconnect at least one and not all of said tabs from said supply.

2. In a circuit arrangement in combination, an alternating current supply, and an electrical capacitor across said supply, said capacitor comprising two electrode foils and a dielectric interposed between same, said foils provided with a plurality of terminal tabs for connecting said capacitor to said supply, and thermo-responsive means actuated from within said capacitor to disconnect at least one and not all of said tabs from said supply.

3. In a circuit arrangement in combination, a load and a capacitor, and an alternating current supply for said load, a resistor connected in series with said load and said supply, said capacitor having two electrode foils and a dielectric disposed between same, a plurality of terminal tabs provided on each of said foils, the tabs on one of the foils being connected across the two ends of the said resistor, and means to compel current to said load to flow through said foil.

4. In a circuit arrangement in combination, an alternating current supply, an electrical capacitor across said supply, said capacitor comprising two electrode foils and a dielectric interposed between same, each of said foils provided with a plurality of terminal tabs for connecting said capacitor to said supply, and means to disconnect at least one and not all of said tabs from said supply.

5. In a circuit arrangement in combination, an alternating current supply, an electrical capacitor across said supply, said capacitor comprising two electrode foils and a dielectric interposed between same, one of said foils provided with a plurality of terminal tabs and at least one of said tabs adapted to be disconnected from said supply.

6. In a circuit arrangement in combination, an alternating current supply and an electrical capacitor across said supply, said capacitor comprising two electrode foils and an interposed dielectric medium, said dielectric medium at temperatures substantially below the normal operating temperature of the capacitor exhibiting low dielectric losses and undergoing a decrease in dielectric constant, said capacitor at the normal operating temperature being characterized by low dielectric losses and low electrical losses in the material of the foils thereof, and means to increase the temperature of said capacitor, said means automatically operative at low temperatures and temporarily increasing the electrical losses in the material of the electrode foils above the normal operating value of such losses.

7. In a circuit arrangement in combination, an alternating current supply, a load, an electrical capacitor having two electrode foils and an interposed dielectric medium connected across the supply between the source thereof and the load, and means for compelling current to said load to flow through at least one of the electrode foils to increase the electrical losses therein to a value greater than the normal operating value of the losses in said foil.

8. The method of operating an electrical capacitor having two electrode foils and an interposed dielectric material and being characterized at normal operating temperatures by substantially low electrical losses in the material of the electrode foils thereof, comprising the steps of heating the capacitor to a predetermined temperature by temporarily increasing the electrical losses in the material of the electrode foils to a value greater than the normal operating value of the losses in said foils, and terminating said increased heating when the capacitor temperature has reached the predetermined temperature by decreasing the electrical losses in the material of the electrode foils to the normal operating value of said losses.

PRESTON ROBINSON.